United States Patent
Kundu et al.

(10) Patent No.: US 11,407,883 B2
(45) Date of Patent: Aug. 9, 2022

(54) HIGH PERFORMING LOW VISCOSITY TIRE SEALANT

(71) Applicant: Illinois Tool Works Inc., Glenview, IL (US)

(72) Inventors: Nihar Ranjan Kundu, Telanga State (IN); Ranjith Kokkot, Telangana State (IN); Ryan Jones, Auburn Hills, MI (US); Martin Spindler, Herdwangen-Schoenach (DE); Suboth Srinivas Deshpande, Telangana State (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/159,828

(22) Filed: Jan. 27, 2021

(65) Prior Publication Data

US 2021/0238394 A1    Aug. 5, 2021

Related U.S. Application Data

(60) Provisional application No. 62/969,438, filed on Feb. 3, 2020.

(51) Int. Cl.
| | |
|---|---|
| *C08L 7/02* | (2006.01) |
| *C08L 21/02* | (2006.01) |
| *B29D 30/06* | (2006.01) |
| *C08L 11/02* | (2006.01) |
| *C08L 9/10* | (2006.01) |
| *C08L 9/04* | (2006.01) |
| *C08K 5/053* | (2006.01) |
| *B29C 73/16* | (2006.01) |

(52) U.S. Cl.
CPC .............. *C08L 7/02* (2013.01); *B29C 73/163* (2013.01); *B29D 30/0685* (2013.01); *C08K 5/053* (2013.01); *C08L 9/04* (2013.01); *C08L 9/10* (2013.01); *C08L 11/02* (2013.01); *C08L 21/02* (2013.01); *B29D 2030/0698* (2013.01); *C08K 2201/014* (2013.01); *C08L 2205/03* (2013.01)

(58) Field of Classification Search
CPC .......... B29C 73/163; B29D 2030/0698; B29D 2030/0685
See application file for complete search history.

(56) References Cited

U.S. PATENT DOCUMENTS

| | | |
|---|---|---|
| 2,357,650 A | 9/1944 | Hall |
| 3,352,696 A | 11/1967 | Wallace |
| 3,739,829 A | 6/1973 | Powell et al. |
| 4,337,322 A | 6/1982 | Jaspon |
| 4,501,825 A | 2/1985 | Magyar et al. |
| 5,371,136 A | 12/1994 | Brooks |
| 5,466,518 A | 11/1995 | Isaac et al. |
| 5,610,212 A * | 3/1997 | Tanaka ...................... C08C 1/04 524/502 |
| 5,856,376 A | 1/1999 | Wong |
| 6,063,837 A | 5/2000 | Kawamura et al. |
| 6,454,892 B1 | 9/2002 | Gerresheim et al. |
| 6,818,596 B1 | 11/2004 | Hayes |
| 6,840,990 B2 | 1/2005 | Gallagher et al. |
| 6,864,305 B2 | 3/2005 | Kishida et al. |
| 7,388,041 B2 | 6/2008 | Cegelski et al. |
| 7,868,061 B2 | 1/2011 | Cegelski et al. |
| 7,968,319 B2 * | 6/2011 | Liu .......................... C12P 7/18 435/158 |
| 8,183,309 B2 * | 5/2012 | Ichikawa ........... B29D 30/0685 523/166 |
| 8,872,370 B2 | 7/2014 | Sulemanji |
| 9,862,156 B2 | 1/2018 | Sulemanji et al. |
| 2004/0010059 A1 | 1/2004 | Kojima et al. |
| 2004/0048962 A1 | 3/2004 | Kojima et al. |
| 2007/0200088 A1 * | 8/2007 | Wehner ................ C11D 3/2093 252/73 |
| 2007/0202073 A1 | 8/2007 | Fenyvesi |
| 2010/0331448 A1 | 12/2010 | Ichikawa |
| 2012/0125235 A1 | 5/2012 | Azeyanagi et al. |
| 2015/0175862 A1 * | 6/2015 | Ichikawa ............. C09K 3/1006 523/166 |
| 2016/0289509 A1 * | 10/2016 | Sulemanji .............. C09J 107/02 |
| 2018/0304564 A1 * | 10/2018 | Dowel .................... B29C 73/02 |
| 2019/0134930 A1 | 5/2019 | Randall |
| 2019/0152174 A1 * | 5/2019 | Naruse ................... C08K 5/053 |

FOREIGN PATENT DOCUMENTS

| | | | |
|---|---|---|---|
| DE | 19844177 B4 | 4/2000 | |
| EP | 0200382 A2 | 12/1986 | |
| EP | 0200382 B1 | 11/1990 | |
| EP | 0753420 B1 | 1/1997 | |
| EP | 846552 A2 * | 6/1998 | ........... B29C 73/163 |
| EP | 0846552 A2 | 6/1998 | |
| EP | 0988960 A2 | 3/2000 | |
| EP | 0972616 A2 | 1/2001 | |
| EP | 0846552 B1 | 11/2001 | |
| EP | 1372941 A1 | 1/2004 | |
| EP | 2001658 | 10/2007 | |
| EP | 2719565 | 4/2014 | |
| JP | 10217344 A * | 8/1998 | ........... B29C 73/163 |
| JP | 2000282081 A * | 10/2000 | |
| JP | 2003082327 A | 3/2003 | |
| JP | 2003193029 A | 7/2003 | |
| JP | 2015098538 A * | 5/2015 | ............. B32B 27/08 |
| JP | 2015098538 A | 5/2015 | |
| WO | 2006/058104 A2 | 6/2006 | |
| WO | 2007/112010 A2 | 10/2007 | |

OTHER PUBLICATIONS

Machine translation of JP-2015098538-A (2015, 13 pages).*

(Continued)

*Primary Examiner* — Brieann R Johnston
(74) *Attorney, Agent, or Firm* — Maxwell J. Petersen; FisherBroyles, LLP

(57) ABSTRACT

A high performing low viscosity tire sealant includes about 15% to about 75% by weight of a biobased aliphatic diol, about 5% to about 50% by weight natural rubber latex, and about 2% to about 50% by weight synthetic rubber latex. The tire sealant exhibits excellent performance at temperatures of −40 degrees Celsius and lower.

23 Claims, 1 Drawing Sheet

(56) References Cited

OTHER PUBLICATIONS

Machine translation of JP-2000282081-A (2000, 6 pages).*
International Search Report and Written Opinion for PCT/US2021/015633, dated May 7, 2021.

* cited by examiner

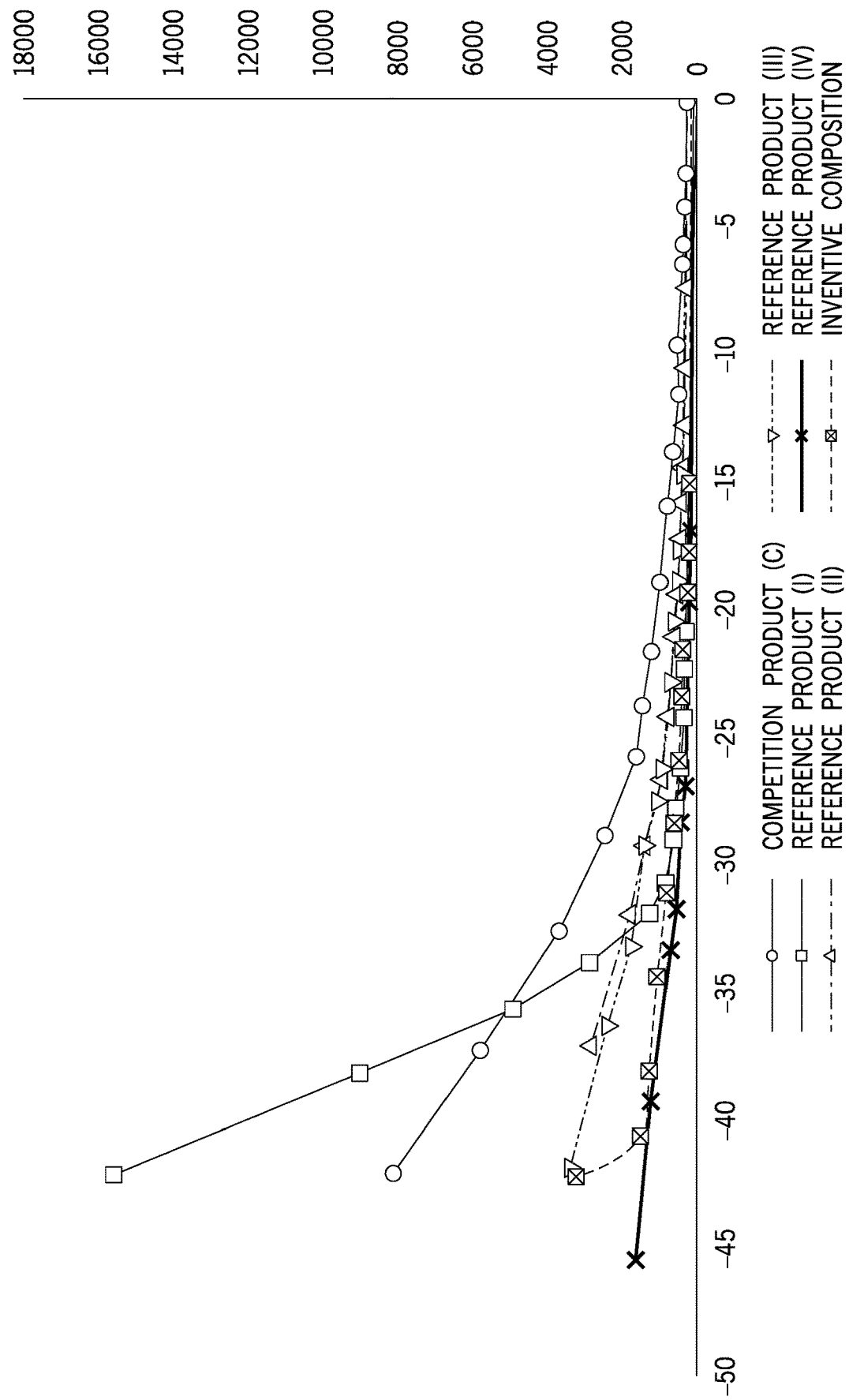

HIGH PERFORMING LOW VISCOSITY TIRE SEALANT

RELATED APPLICATIONS

This patent application claims priority to U.S. Provisional Application 62/969,438, filed on Feb. 3, 2020, the disclosure of which is incorporated herein by reference.

FIELD OF THE INVENTION

This invention relates to a high performing low viscosity sealant composition for tire repair that can be easily injected into the punctured tire yet provided very good sealing of the puncture.

BACKGROUND OF THE INVENTION

Conventional tire sealants include an antifreeze agent such as propylene glycol, glycerin or ethylene glycol; rubber latexes such as natural rubber latex and synthetic rubber latex, for example styrene-butadiene rubber latex; and minor ingredients such as ultrafine fillers, antioxidants, dispersants and fibers. The antifreeze agent is an important ingredient because it governs the viscosity of sealing agent at low temperature. Low viscosity at subzero temperature is of paramount importance for easy delivery of sealing agent into the tire and to the puncture hole. In addition to ethylene glycol, propylene glycol and glycerin, known antifreeze agents include solutions of potassium acetate with or without glycerin, trimethyl glycine, dimethyl sulfoxide, and derivatives and combinations thereof. Ethylene glycol (EG) has been used widely due to its low viscosity and superior freezing behavior at subzero temperature. Yet ethylene glycol is toxic. With more stringent regulations, the use of EG is rapidly diminishing in tire sealant compositions. Its upper homologue, propylene glycol (PG) is more environmentally friendly and has replaced EG in several sealant compositions. Yet PG is more viscous than EG, and PG based tire sealants have higher viscosities at subzero temperatures than their EG-based counterparts. Consequently, PG-based tire sealants are useful over a more limited temperature range.

Adding sufficient water to PG-based tire sealants lowers their viscosity but increases the freezing temperature of the sealants and thus limits their usage temperatures. Increasing the amount of PG relative to water reduces the freezing temperature but, due to the higher viscosity, reduces the amount of rubber that can be used, which in turn adversely affects sealing performance. The use of fibers and ultrafine fillers increases the strength of the coagulation used for sealing the puncture hole, but further raises the viscosity of the sealant in competition with the increased viscosity cause by the PG. Combinations of EG and PG have been used in some sealants to achieve a balance of adequate viscosity and usage temperature range, for smoother delivery of the sealing agent to the punctured site.

For a high performing environment friendly tire sealing composition, it is desirable that the sealant composition be delivered easily to the puncture hole, remains flowable at temperatures down to −40° C., meets stringent legislation requirements, and forms a plug with high sealing strength using a minimum quantity of sealant. There is thus a need or desire for an improved high performing environment friendly sealant with easy injectability and easy delivery to the puncture hole at temperature as low as −40° C., and with high sealing strength.

SUMMARY OF THE INVENTION

The present invention is directed to a high performance, environmentally friendly tire sealing composition that is useful at temperatures down to −40° C. or lower and has lower viscosity than various conventional tire sealing compositions. In one embodiment, the inventive tire sealant composition minimizes the amount of material required to be delivered to the puncture site. In one embodiment, the inventive tire composition complies with various environmental standards, including without limitation Europe's REACH (Regulation, Authorization and Restriction of Chemicals) and K-REACH, California's Proposition 65, Canada's WHMIS (Workplace Hazardous Materials Information System), the United States' TSCA (Toxic Substance Controls Act) and CPSC (Consumer Product Safety Commission), Hong Kong's CLP, the GADSL (Global Automotive Declarable Substance List), and the Auto OEM Restricted Chemicals List.

In one embodiment, the invention is directed to a puncture sealing composition that includes at least the following ingredients:

about 15% to about 75% by weight of a biobased aliphatic diol;

about 5% to about 50% by weight natural rubber latex; and about 2% to about 50% by weight synthetic rubber latex.

In another embodiment, the invention is directed to the foregoing puncture sealing composition in which the ingredients and amounts are selected to provide a freezing temperature of −40 degrees Celsius or lower.

In another embodiment, the invention is directed to a method of making a puncture sealing composition that includes the steps of adding and mixing the following ingredients together in a reactor, followed by sufficient stirring:

about 15% to about 75% by weight of a biobased aliphatic diol;

about 5% to about 50% by weight natural rubber latex; and about 2% to about 50% by weight synthetic rubber latex.

The characteristics and advantages of the invention will become further apparent from the following Detailed Description, read in conjunction with the drawing.

BRIEF DESCRIPTION OF THE FIGURE

FIG. 1 illustrates a viscosity curve of an inventive composition as a function of temperature, compared to five known tire sealant products.

DETAILED DESCRIPTION OF THE INVENTION

In accordance with the invention, a puncture sealing composition is provided that has sufficiently low viscosity and freezing temperature to enable its flow and use in repairing tires at temperatures as low as −40 degrees Celsius, suitably as low as −45 degrees Celsius. The puncture sealing composition includes a biobased aliphatic diol, natural rubber latex and synthetic rubber latex, and may also include added water, a tackifier, a surfactant/dispersing agent, glycerin, filler and/or fibers.

The biobased aliphatic diol can be present at about 15% to about 75% by weight, suitably about 25% to about 65% by weight, or about 35% to about 45% by weight of the puncture sealing composition. Suitable biobased aliphatic diols include biobased propane-1,3 diols and combinations thereof. Exemplary propane-1,3 diols include without limitation 1,3-propanediol, 2-methyl-2-propyl-1,3-propanediol, neopentyl glycol, and combinations thereof, with 1,3-propanediol being particularly suitable. In one embodiment, the biobased aliphatic diol, such as the propane-1,3 diol, is the only antifreeze agent in the tire sealant composition. The tire sealant composition can be substantially free or free of ethylene glycol, propylene glycol, glycerin, sorbitol, glycol ethers, potassium acetate, trimethyl glycine, dimethyl sulfoxide and other alternative antifreeze agents. The term "substantially free" means that the antifreeze agent will include at least about 95 parts by weight of the biobased aliphatic diol and not more than about 5% by weight of another antifreeze component. In another embodiment, such alternative antifreeze agents can be employed in combination with the biobased aliphatic diol.

The natural rubber latex can be present at about 5% to about 50% by weight, or about 10% to about 40% by weight, or about 20% to about 30% by weight of the puncture sealing composition. The natural rubber latex can suitably be substantially free of coagulants, and suitably has an average particle size of about 400 microns or less. This can be accomplished by preparing a highly filtered natural rubber latex by filtering the natural rubber latex through a mesh screen. The mesh screen can have openings of about 300-500 microns, suitably about 400 microns. Pumping the natural rubber latex through the mesh screen places the natural rubber latex in a fine, free-flowing state that enables passage through the valve stem of a tire without removing the core and seal. The highly filtered natural rubber latex can also be biodegradable.

The natural rubber latex can, in one embodiment, include about 55-65% by weight natural rubber, up to about 0.25% by weight ammonia, and a balance substantially of water. The natural rubber latex can also be biodegradable and can also have a mechanical stability in excess of about 1050 seconds.

The synthetic rubber latex can be present at about 2% to about 50% by weight, or about 3% to about 25% by weight, or about 4% to about 10% by weight of the puncture sealing composition. Suitable synthetic rubber latexes include without limitation styrene-butadiene rubbers, acrylonitrile-butadiene rubbers, ethylene vinyl acetates, chloroprene rubbers, vinyl pyridine rubbers, butadiene rubbers, and combinations thereof, in a latex form. As with natural rubber latexes, the synthetic rubber latex can include a quantity of water as needed to form the latex.

Glycerin can optionally be present at about 1% to about 15% by weight, suitably about 2% to about 10% by weight, or about 4% to about 8% by weight of the puncture sealing composition. The added water, which can suitably be deionized water, can be present at about 2% to about 25% by weight, or about 5% to about 20% by weight of the puncture sealing composition. The optional addition of water recognizes the fact that some water may already be present in other ingredients, such as the natural rubber latex or synthetic rubber latex, and the added water may or may not be needed to achieve optimum viscosity.

The puncture sealing composition can also include a tackifier, suitably in an amount of about 2% to about 15% by weight, or about 3% to about 10% by weight, or about 4% to about 8% by weight. Suitable tackifiers include without limitation terpene resins, phenolic resins, polyvinyl esters, polyvinyl alcohol, polyvinyl pyrrolidone, and combinations thereof. The function of the tackifier, when used, is to improve adhesion between the rubber particles and other solid ingredients used to form a plug over the puncture.

The puncture sealing composition can also include a filler and/or fibers in an amount of about 0.1% to about 5% by weight, or about 1% to about 3% by weight. Suitable fillers include without limitation calcium carbonate, barium carbonate, silicon dioxide, titanium dioxide, calcium sulfate, barium sulfate, aluminum oxide, and combinations thereof. When used, the filler and/or fibers can have an ultrafine particle or fiber diameter of about 150 nanometers or less, or about 100 nanometers or less.

The puncture sealing composition can also include a surfactant which acts as a dispersing agent for the filler and/or fibers, which can be present at about 0.1% to about 5% by weight, or about 2% to about 4% by weight. Suitable surfactants include without limitation nonionic emulsifiers, polyamide suspensions, silica suspensions, and combinations thereof. Examples of suitable nonionic emulsifiers include without limitation fatty alcohol ethoxylates and fatty alcohol polyglycol ethers. One suitable polyamide suspension is a paste-like suspension of a polyamide in a solvent that includes water and propylene glycol monomethyl ether. The foregoing can also be combined with similar amounts of a silica suspension for improved dispersion and anti-settling properties. Other surfactants include without limitation dispersing agents based on acrylic polymers and antioxidants based on hindered polymeric phenols.

The present invention is also directed to a method of making a puncture sealing composition. The method includes the steps of adding and mixing the following ingredients together in a reactor, followed by sufficient stirring:

about 15% to about 75% by weight of a biobased aliphatic diol;

about 5% to about 50% by weight natural rubber latex; and about 2% to about 50% by weight synthetic rubber latex.

Example 1

A puncture sealing composition was prepared according to the method of the invention, having the following composition:

| Ingredient | Percent By Weight |
| --- | --- |
| Natural rubber latex | 25.0 |
| Synthetic rubber latex | 5.0 |
| Surfactant (nonionic emulsifier) | 4.0 |
| Added water | 18.5 |
| Resin (tackifier) | 5.5 |
| 1,3-propanediol | 42.0 |

The puncture sealing composition was tested for freezing point, viscosity, viscosity profile, pH and other properties against five alternative puncture sealing compositions. The results of the comparison are summarized in Table 1 below. As shown, the puncture sealing composition of the invention had the lowest freezing point and the lowest viscosity measured at standard conditions.

TABLE 1

Comparative data of the invented composition over known puncture sealing compositions

| No | Characteristics | Inventive composition | Reference Products I | II | III | IV | Competition product |
|----|---|---|---|---|---|---|---|
| 1 | Environmental Compliance REACH, Prop65, WHMIS, TSCA, CLP, CPSC(16), K-REACH, Global Automotive declarable substance List(GADSL), Auto OEM restricted chemicals List | Pass | Pass | Pass | Pass | Does not pass | NA |
| 2 | Freezing point (approx. ° C.) | −45 | −30 | −20 | −40 | −30 | NA |
| 3 | Viscosity (cP), #3/100 rpm, 24° C. | 53 | 70 | 81 | 75 | 49 | 113 |
| 4 | Viscosity profile between −30 Deg C. and −40 Deg C. Brookfield DV II | Lower than reference product at corresponding temperature between −30 & −40° C. (Refer section 8.0 FIG. 1) | Higher (Ref. FIG. 1) | Higher (Ref. FIG. 1) | Higher (Ref. FIG. 1) | Overlaps till −35° C. and then lower Ref. FIG. 1 | Higher (Ref. FIG. 1) |
| 5 | pH (25° C.) | 9.05 | 9.16 | 9.4 | 9.36 | 9.44 | 8.73 |
| 6 | Solid content (3 hr, 110° C.) | 31.8% | 30.450 | 66.36 | 30.56 | 38.96 | 33.67 |
| 7 | Valve core clogging test | Pass | Pass | Pass | Pass | Pass | NA |

FIG. 1 shows the viscosity profile of each of the foregoing puncture sealing compositions as a function of temperature. The puncture sealing composition of the invention had the lowest viscosity profile and the difference became very significant at temperatures below −30 degrees Celsius. This indicates that the puncture sealing agent of the invention may be the only one that exhibits consistent and reliable performance at very low temperatures.

The embodiments of the invention described herein are exemplary, and various modifications and improvements can be made without departing from the spirit and scope of the invention. The scope of the invention is defined by the appended claims, and all changes that fall within the meaning and range of equivalents are intended to be embraced therein.

We claim:

1. A puncture sealing composition, comprising:
about 15% to about 75% by weight of a biobased aliphatic diol;
about 10% to 40% by weight of a biodegradable highly filtered natural rubber latex that has a mechanical stability in excess of about 1050 seconds and an average particle size of about 400 microns or less; and
about 2% to about 10% by weight synthetic rubber latex;
wherein the biobased aliphatic diol constitutes at least about 95% by weight of a total amount of an antifreeze composition in the puncture sealing composition and the puncture sealing composition has a viscosity of less than 2000 centipoise at a temperature of about −40° C.

2. The puncture sealing composition of claim 1, comprising about 2% to about 25% by weight added water.

3. The puncture sealing composition of claim 1, further comprising about 2% to about 15% by weight of a tackifier.

4. The puncture sealing composition of claim 1, about 0.1% to about 5% by weight of a surfactant.

5. The puncture sealing composition of claim 1, further comprising about 0.1% to about 5% by weight of a filler and/or fibers.

6. The puncture sealing composition of claim 1, wherein the biobased aliphatic diol is selected from the group consisting of biobased propane-1,3 diols and combinations thereof.

7. The puncture sealing composition of claim 1, wherein the biobased aliphatic diol is present at about 25% to about 65% by weight.

8. The puncture sealing composition of claim 1, wherein the biobased aliphatic diol is present at about 35% to about 45%.

9. The puncture sealing composition of claim 1, wherein the antifreeze agent further comprises glycerin.

10. The puncture sealing composition of claim 1, wherein the biodegradable highly filtered natural rubber latex is substantially free of coagulants.

11. The puncture sealing composition of claim 1, wherein the biodegradable highly filtered natural rubber latex is present at about 20% to about 30% by weight.

12. The puncture sealing composition of claim 1, wherein the synthetic rubber latex is selected from the group consisting of styrene-butadiene rubbers, acrylonitrile-butadiene rubbers, ethylene vinyl acetates, chloroprene rubbers, vinyl pyridine rubbers, butadiene rubbers, and combinations thereof.

13. The puncture sealing composition of claim 1, wherein the synthetic rubber latex is present at about 4% to about 10% by weight.

14. The puncture sealing composition of claim 2, wherein the added water is present at about 5% to about 20% by weight.

15. The puncture sealing composition of claim 3, wherein the tackifier is selected from the group consisting of terpene resins, phenolic resins, polyvinyl esters, polyvinyl alcohol, polyvinyl pyrrolidone, and combinations thereof.

16. The puncture sealing composition of claim 3, wherein the tackifier is present at about 3% to about 10% by weight.

17. The puncture sealing composition of claim 4, wherein the surfactant comprises a nonionic emulsifier.

18. The puncture sealing composition of claim 5, wherein the filler is selected from the group consisting of calcium carbonate, barium carbonate, silicon dioxide, titanium dioxide, calcium sulfate, barium sulfate, aluminum oxide, and combinations thereof.

19. A puncture sealing composition, comprising:
   about 15% to about 75% by weight of a biobased aliphatic diol;
   about 10% to 40% by weight of a biodegradable highly filtered natural rubber latex that has a mechanical stability in excess of about 1050 seconds and an average particle size of about 400 microns or less; and
   about 2% to about 10% by weight synthetic rubber latex;
   wherein the biobased aliphatic diol constitutes at least about 95% by weight of a total amount of an antifreeze composition in the puncture sealing composition and the puncture sealing composition has a freezing temperature of about −40 degrees Celsius or lower and has a viscosity of less than 2000 centipoise at a temperature of about −40° C.

20. The puncture sealing composition of claim 19, wherein the freezing temperature is about −45 degrees Celsius or lower.

21. The puncture sealing composition of claim 19, wherein the puncture sealing composition has a viscosity of about 60 centipoise or less at 25 degrees Celsius.

22. The puncture sealing composition of claim 21, wherein the viscosity is about 55 centipoise or less at 25 degrees Celsius.

23. A method of making a puncture sealing composition, comprising the steps of adding and mixing the following ingredients together in a reactor, followed by sufficient stirring:
   about 15% to about 75% by weight of a biobased aliphatic diol;
   about 10% to 40% by weight of a biodegradable highly filtered natural rubber latex that has a mechanical stability in excess of about 1050 seconds and an average particle size of about 400 microns or less; and
   about 2% to about 10% by weight synthetic rubber latex;
   wherein the biobased aliphatic diol constitutes at least about 95% by weight of a total amount of an antifreeze composition in the puncture sealing composition and the puncture sealing composition has a viscosity of less than 2000 centipoise at a temperature of about −40° C.

* * * * *